(12) United States Patent
Osheroff et al.

(10) Patent No.: US 11,131,467 B2
(45) Date of Patent: Sep. 28, 2021

(54) HVAC SYSTEM WITH VOLUME MODULATING VALVE

(71) Applicants: Gene Osheroff, Huntington Beach, CA (US); Jeff Osheroff, Rolling Hills Estates, CA (US)

(72) Inventors: Gene Osheroff, Huntington Beach, CA (US); Jeff Osheroff, Rolling Hills Estates, CA (US)

( * ) Notice: Subject to any disclaimer, the term of this patent is extended or adjusted under 35 U.S.C. 154(b) by 0 days.

(21) Appl. No.: 16/714,420

(22) Filed: Dec. 13, 2019

(65) Prior Publication Data

US 2020/0326082 A1 Oct. 15, 2020

Related U.S. Application Data

(60) Provisional application No. 62/832,798, filed on Apr. 11, 2019.

(51) Int. Cl.
*F24F 13/10* (2006.01)
*F24F 3/00* (2006.01)
*F24F 13/20* (2006.01)
*F24F 3/044* (2006.01)

(52) U.S. Cl.
CPC ............... *F24F 3/00* (2013.01); *F24F 13/10* (2013.01); *F24F 2003/003* (2013.01); *F24F 2003/005* (2013.01); *F24F 2003/0446* (2013.01); *F24F 2013/207* (2013.01)

(58) Field of Classification Search
CPC ......... F24F 3/00; F24F 13/10; F24F 2003/003
USPC .......................................... 236/49.3; 165/217
See application file for complete search history.

(56) References Cited

U.S. PATENT DOCUMENTS

| | | | | |
|---|---|---|---|---|
| 4,732,318 A | * | 3/1988 | Osheroff | F24F 3/0442 236/49.3 |
| 4,838,483 A | * | 6/1989 | Nurczyk | F24F 11/0001 236/49.3 |
| 4,890,666 A | * | 1/1990 | Clark | G05D 23/1917 165/208 |
| 5,450,999 A | * | 9/1995 | Scholten | G05D 7/0623 236/49.3 |

(Continued)

FOREIGN PATENT DOCUMENTS

CN 204301192 U * 4/2018

OTHER PUBLICATIONS

Translation of Chinese Patent Document CN 204301192 U entitled Translation—CN 204301192 U (Year: 2020).*

*Primary Examiner* — Paul Alvare
(74) *Attorney, Agent, or Firm* — Inskeep IP Group, Inc.

(57) ABSTRACT

An HVAC system is described having components of a variable refrigerant flow (VRF) outdoor compressor unit connected to an indoor fan coil unit. The indoor fan coil unit supplies air to ducts that condition a plurality of zones. Each zone has a volume modulating air damper that can maintain a predetermined volume of air flowing through it. As the dampers for some zones vary between open and close positions, the air pressure in the ducts changes. The volume modulating dampers compensate for these pressure changes, ensuring that only the predetermine volume of air is passing into the zones. By regulating the volume of into each zone, the volume modulating air dampers can restrict the air volume through the fan coil causing the outdoor unit to reduce compressor speed, thereby saving energy.

14 Claims, 6 Drawing Sheets

(56) References Cited

U.S. PATENT DOCUMENTS

| | | | | |
|---|---|---|---|---|
| 6,386,281 B1* | 5/2002 | Ganesh | ............... | F24F 3/1405 |
| | | | | 165/252 |
| 10,030,882 B2* | 7/2018 | Karamanos | .......... | G05D 7/0676 |
| 2015/0019022 A1* | 1/2015 | Karamanos | .......... | G05D 7/0647 |
| | | | | 700/276 |
| 2020/0218233 A1* | 7/2020 | ElBsat | ................. | G06Q 50/06 |

\* cited by examiner

HVAC SYSTEM WITH VOLUME MODULATING VALVE

RELATED APPLICATIONS

This application claims priority to U.S. Provisional Application Ser. No. 62/832,798 filed Apr. 11, 2019 entitled Energy Savings Damper, which is hereby incorporated herein by reference in its entirety.

BACKGROUND OF THE INVENTION

Heating, ventilation, and air conditioning (HVAC) is a term that generally refers to technology that maintains temperature comfort and acceptable air quality for indoor environments.

Two popular modern HVAC systems variable air volume VAV systems and variable refrigerant flow VRF systems.

VAV systems are those that use dampers and thermostats to change the airflow rate to a room or zone but maintain the fan supplied airflow at a constant temperature. For example, a duct will supply air to a room at 55 degrees Fahrenheit. The zone damper and room thermostat in this duct will vary the cool air volume that reaches the room. A VAV system is very efficient way to cool a plurality of rooms or zones in a building when full Compressor capacity and Fan capacity are required. Full compressor capacity is only required five percent of the year. The rest of the year the compressor capacity is too great for the number of zones that require cooling. For example, in a system with a plurality of zones when only a few zones require cooling both fan and compressor capacity must be reduced.

To reduce fan pressure at full fan speed cooled system air is bypassed to the return side of the fan. Air volume that is not bypassed is sent to the duct system because only a few dampers are open. In this way the fan is using full energy when only a smaller amount of energy is required.

To reduce the compressor capacity when the leaving air temperature falls below 55 degrees Fahrenheit the compressor is turned off for five or more minutes. After this delay period the compressor is turned on. This on off operation is costly because the refrigerant pressure has to be raised as much as 200 PSI. and inrush power to restart the compressor motor is very high.

A ductless VRF system typically circulates refrigerant through a plurality of evaporator fan coils. The airflow through these fan coils is varied by a room thermostat that reduces the airflow as the room temperature approaches the thermostat set point.

As the airflow reduces an expansion valve in the fan coil reduces the amount of refrigerant flowing to the fan coil. Based on this reduced refrigerant volume the compressor speed is reduced saving energy.

What is needed is an improved HVAC system that combines the efficiencies of VRF systems with VAV systems.

SUMMARY OF THE INVENTION

In one embodiment, an HVAC system is described having components of a variable refrigerant flow (VRF) outdoor compressor unit connected to a plurality of indoor fan coil units. The indoor fan coil unit supplies air to ducts that condition a plurality of zones. Each zone has a volume modulating air valve that can maintain a predetermined volume of air flowing through it. As the valves for some zones vary, the air pressure in the main duct changes. The volume modulating valves compensate for these static pressure changes, ensuring that only the predetermine volume of air is passing into the zones. By regulating the volume of air into each zone, the volume modulating air valve can completely control the volume of air flowing through the fan coil and thereby reduce compressor energy of the outdoor unit.

In one embodiment, the volume modulating valves include a device for determining the air velocity passing through it. For example, a pitot tube. The valves further include a motor to control a valve blade, and a control board to modulate the valve blade to achieve a target velocity based on the velocity sensor readings.

In another embodiment, the present invention includes a method for operating an HVAC system having an outdoor VRF unit, indoor fan coils, a volume modulating valve, and a thermostat. The volume modulating valve limits the velocity of air passing through it so that the volume of air passing into the zone can be known. By limiting the amount of air passing through the indoor fan coil unit, the outdoor VRF unit can adjust its compressor and save energy.

Generally, the volume modulating air valves of the present invention uniquely connect to a VRF system since the volume modulating air valves precisely measure the airflow through a VRF indoor fan coil which allows the VRF indoor fan coil to relay this information to the VRF outdoor unit. The outdoor unit increases or decreases refrigerant flow to the VRF indoor fan coil based entirely on the air volume.

Since the VRF indoor fan coil fan blows air into the duct system and all of the exits from the duct system have the volume modulating air valves of the present invention, the only way for air to flow through the VRF indoor fan coil is for thermostats to open one or more of the volume modulating air valves. Since the airflow through the volume modulating air flow is relatively precisely known, the VRF outdoor unit can regulate the refrigerant to match the zones heating or cooling loads. Hence, on light load days heating or cooling energy is not wasted, similar to a system consisting entirely of VRF components.

In currently available VAV systems, the fan operates to deliver a fixed volume of air (cubic feet per minute or CFM) at full cooling load. As dampers in a VAV system close, less air is needed and excess air is eliminated by reducing fan RPM or bypassing air around the fan. In currently available VRF systems, three speed fans or a PID pulsed fan speed may control Fan RPM.

In the system of the present invention, a discharge damper control is created using many volume modulating air valves. Each volume modulating air valve, controlled by a thermostat, delivers a specified quantity/volume (CFM) of air to its conditioned space. A group of volume modulating air valves automatically determine the total volume or number of CFM's that can exit the fan coils duct system. These volume modulating air valves form a variable discharge damper which controls the volume of air or CFM that leave or can enter the fan coils duct system. Therefore, no excess CFM are generated by the Fan. The Fan RPM does not need to be changed and no air needs to be bypassed.

This unique fan control system using volume modulating air valves to generate a variable discharge damper is new to HAVC systems. It is also one of the reasons the system of the present invention works efficiently. Ordinary dampers can't reliably do this job because velocity pressure changes will wildly change their air flow or CFM.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
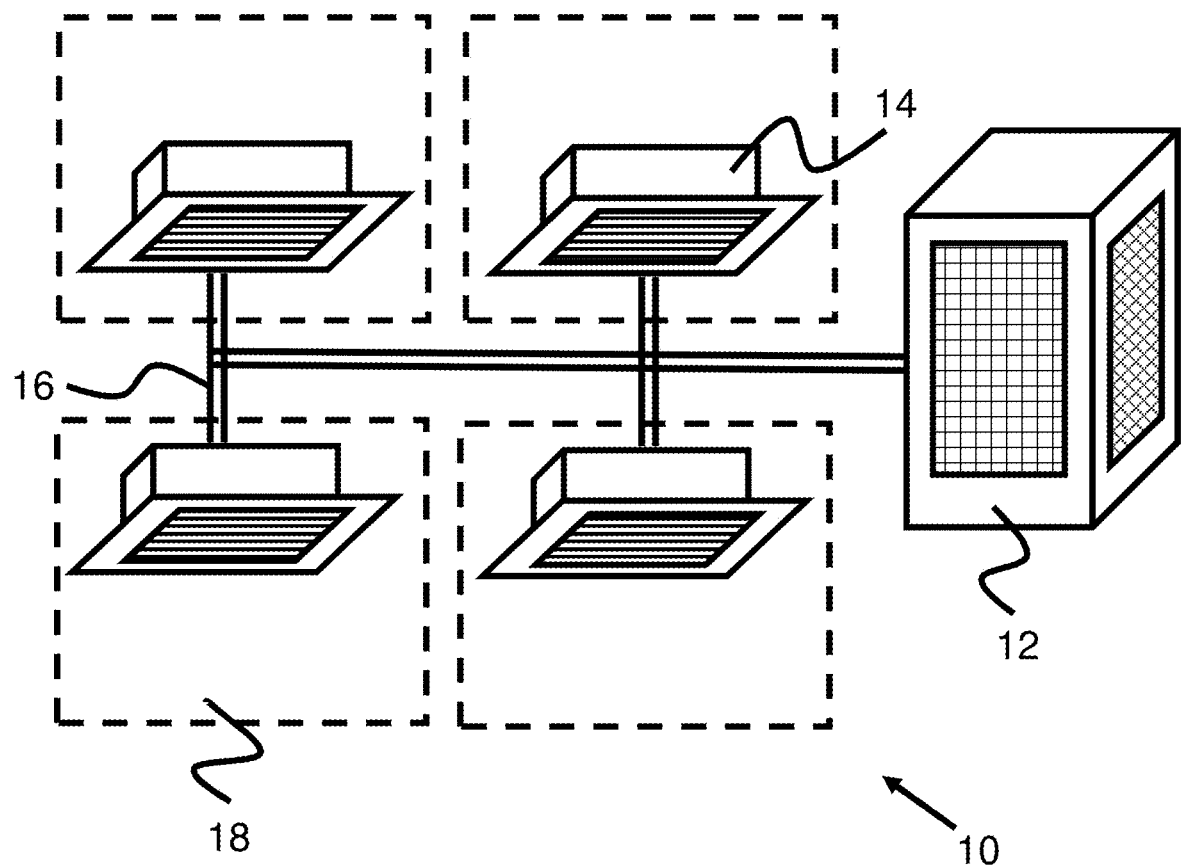
FIG. 1 illustrates a traditional VRF system, as used in the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention is generally directed to an HVAC system that uses one or more volume modulating valves and a control system to measure and deliver specific volumes of air. As described in greater detail below, by combining the volume modulating valves and control system to components of a traditional VRF system, the present invention can emulate the operation of VRF indoor units as well as adjust the temperature of a zone while reducing the complexity and costs associated with a traditional VRF system.

FIG. 1 illustrates an example overview of a traditional VRF system 10 in which multiple indoor fan coil units 14 are connected to a single outdoor VRF unit 12 via refrigerant lines 16. Each indoor fan coil unit 14 typically includes evaporator coils through which the refrigerant passes and a fan to blow air past the coils. Each unit 14 is typically installed in a zone 18 of a building and can be activated as necessary to condition that zone 18. The outdoor VRF unit 12 determines the temperature demands of the system based on the superheat temperature of the refrigerant and the volume of air passing through each indoor fan coil unit 14 and varies its compressor speed to adjust the refrigerant (or gas) temperature accordingly. This allows delivery of an appropriate amount of refrigerant to meet the temperature conditioning needs of the indoor fan coil units 14.

VRF systems 10 typically have improved energy efficiency over other systems. However, their installation can be expensive, since each indoor fan coil units 14 are connected to long refrigerant lines 16, as well as condensate drain lines. Further, since refrigerant lines 16 often have numerous branch points, they provide risk of leakage.

Figure 2:
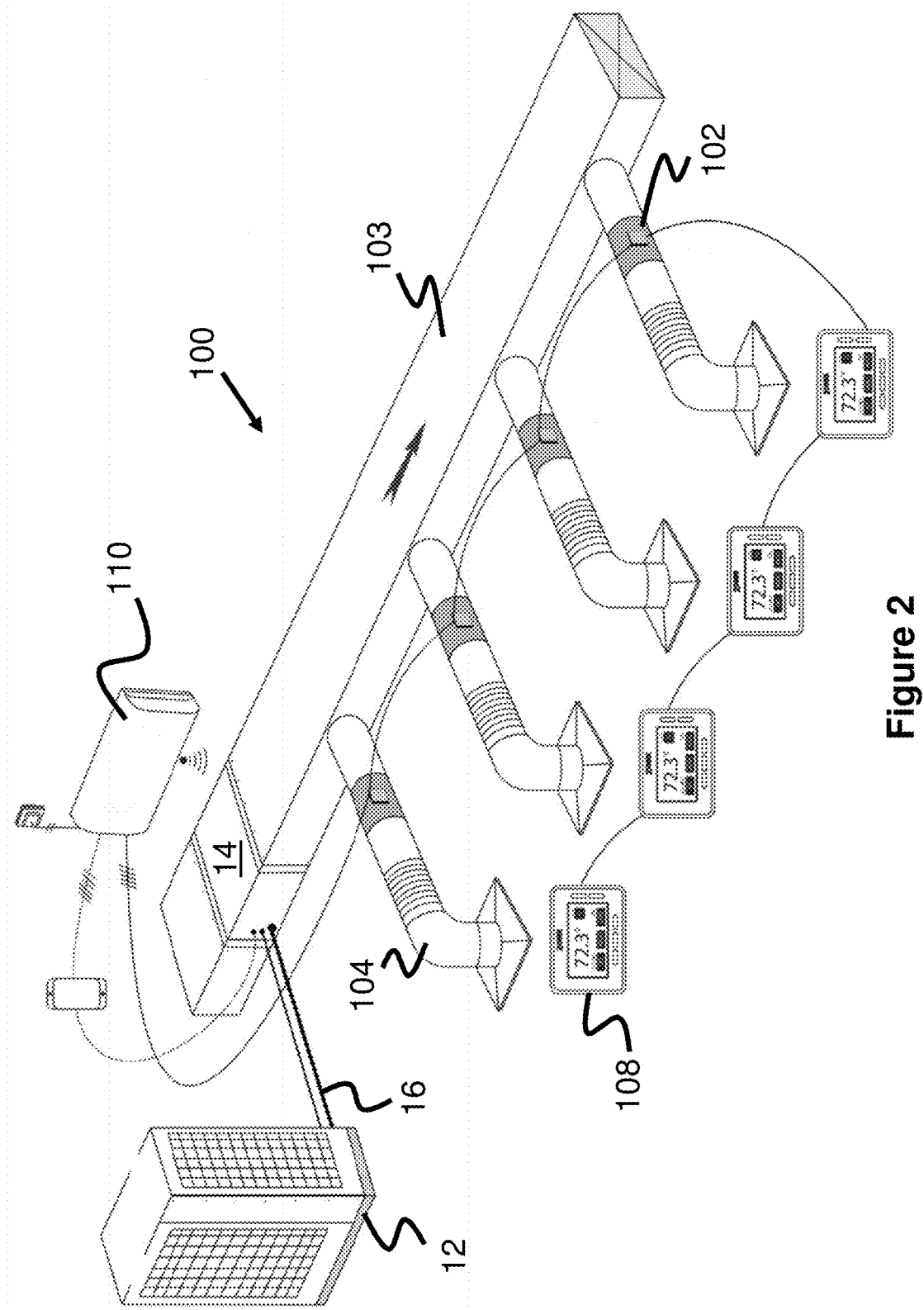
FIG. 2 illustrates an HVAC system using traditional VRF components and ducted air components.
Figure 3:
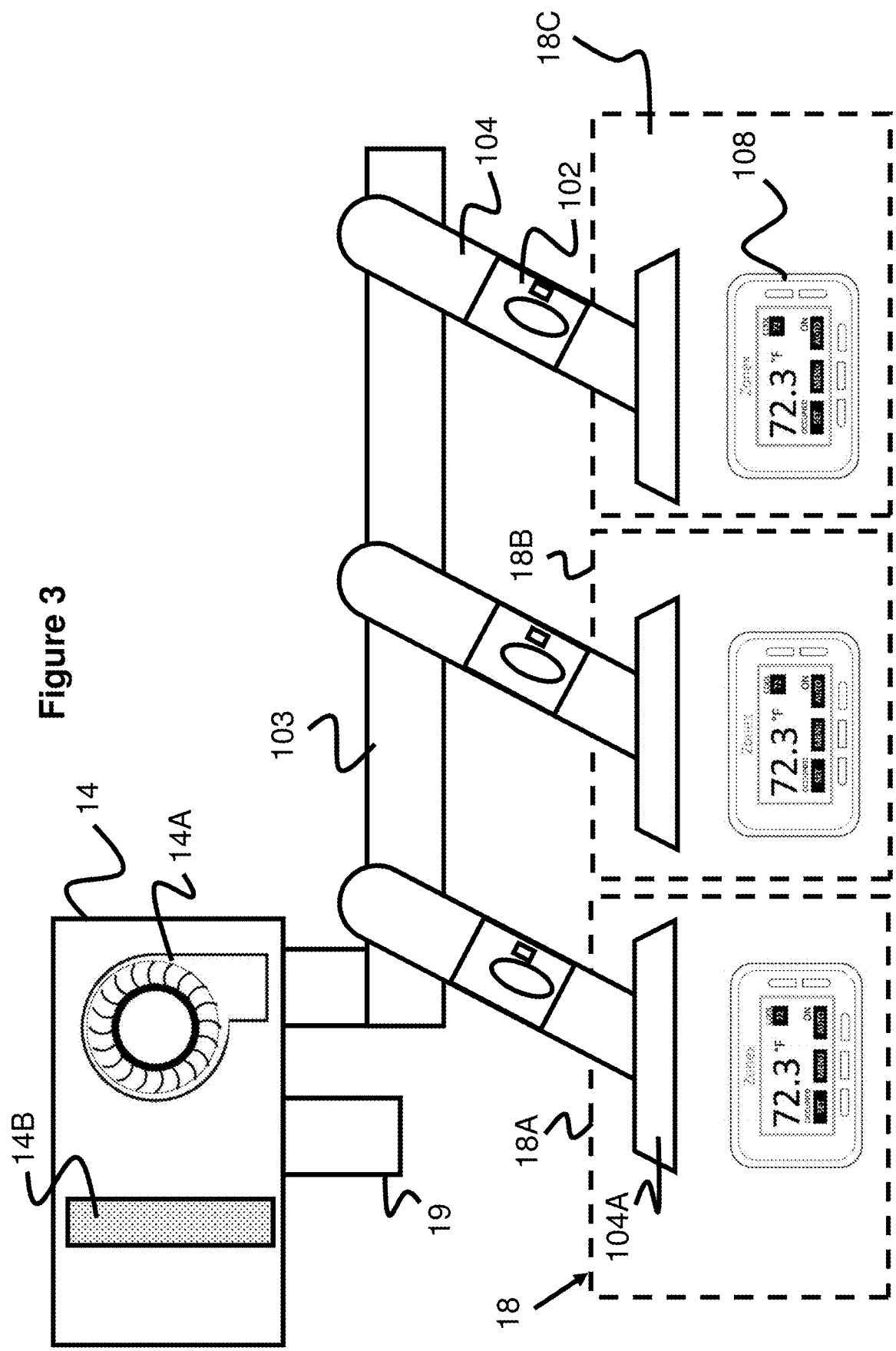
FIG. 3 illustrates another view of the HVAC system of FIG. 2.

FIGS. 2 and 3 illustrate an example HVAC system 100 of the present invention that combines aspects of a traditional VRF system 10 with air blown through a plurality of ducts 103 and 104. Instead of providing an indoor fan coil unit 14 in each zone 18, a single indoor fan coil unit 14 can supply conditioned air to several different zones 18. Since the ducts 20 for each of these zones 18 have volume modulating valves 102 that are controlled to provide predetermined volumes of air, the temperature for each zone 18 can be appropriately conditioned.

Each zone 18 preferably has its own thermostat 108 that is connected to the volume modulating valve 102 supplying air for that zone 18. Each thermostat 108 can be used to monitor the current temperature in a zone 18 and send commands to the volume modulating valve 102 to allow passage of a predetermined volume of air (by measuring the air velocity). Since the volume modulating valves 102 are frequently opening and closing various amounts based on the temperature needs for a zone 18, the air pressure in ducts 103 and 104 may frequently change also. Without the volume modulating valve, this would otherwise lead to more or less volume of air being unpredictably delivered from each vent 104A in each zone 18 and can lead to each zone 18 changing temperature at an unpredictable rate. The volume modulating valves 102 constantly measure the velocity of air passing through them and also constantly adjust their valve blade positions so that only a specific, determined volume of air is being delivered to a zone 18. As discussed in further detail below, this allows for efficient operation of the indoor fan coil 14 and the outdoor VRF unit 12.

It should be noted that part of the energy saving functionality of a VRF system 10 is the ability of the outdoor VRF unit 12 to adjust its compressor to provide only the necessary refrigerant cooling (or heating) and pressure to the indoor fan coil units 14 instead of constantly running and/or starting and stopping. This allows the outdoor VRF unit 12 to adjust the compressor speed and refrigerant flow to provide for only the needed amounts of cooling or heating. For example, refrigerant flow can typically be adjusted from its full volume down to 35%. The goal is to keep the compressor running at the lowest level or speed possible that still provides the appropriate cooling, with as few on/off operations as possible. Shutting down the compressor causes the refrigerant pressures in the system to equalize and therefore requires relatively large amounts of pressure when started back up (e.g., 200 pounds or more). Hence, lower, constant compressor speeds tend to be more efficient than higher speeds with starts and stops.

The outdoor VRF unit 12 is able to adjust its compressor speed by monitoring the temperature and superheat of the refrigerant. The speed at which the refrigerant heats up is dependent on how much air the fan 14A passes through the evaporator coils 14B of the indoor fan coil units 14 from the air return 19 (see FIG. 3). Generally, if more air passes over the evaporator coil 14B, the refrigerant warms more quickly (assuming the system is cooling the zones 18). If less air passes over the evaporator coils 14B, the refrigerant warms less quickly (assuming the system is cooling the zones 18). In a traditional VRF system 10 as in FIG. 1, the indoor fan coil units 14 can deliver cooling/heating to a zone 18 at a relatively moderate rate. Slowing down the cooling process helps reduce the speed that the compressor of the outdoor VRF unit 12 must turn operate at, and thereby uses less power.

With reference to FIGS. 2 and 3, if the system 100 ONLY had traditional damper valves that fully opened and fully closed (i.e., no volume modulating valves 102), it would not be able to perform the slower or moderate cooling that a traditional VRF system 10 performs, causing higher operating costs of its compressor and losing significant energy efficiency.

The reason for this is traditional dampers cannot measure the amount of air passing through them. As more traditional dampers are closed, the static pressure and the velocity of air passing through the remaining open dampers increases. For example, in FIG. 3, as the traditional dampers for zones 18A and 18B are closed, more air will be forced out of the third traditional damper in zone 18C. Hence, the fan coil will see little change in air volume passing through it and the compressor of the outdoor VRF unit 12 will not reduce speed to a lower power level. Put another way, the fan coil will continue to pass the same amount of air when one traditional damper is open as when three traditional dampers are open, and therefore will require the same amount of cooling from the outdoor VRF unit. This prevents the outdoor VRF unit from reducing its power/operation level to a lower state and use less energy.

In contrast, the volume modulating valve 102 can deliver predetermined, measured volumes of air to a zone 18 (e.g., a specific cubic foot per minute requested by a thermostat). Returning to FIG. 3, if the volume modulating valves 102 of the first two zones 18A and 18B are closed, the air passing through the third volume modulating valve 102 of zone 18C will not increase in speed, velocity, or static pressure because that valve 102 will then immediately adjust (e.g., close slightly) to maintain the same volume of air passing through the vent 104A (i.e., by changing the valve blade position). In that respect, the third zone 18C will continue to get the same volume of air into the zone 18 requested by the thermostat 108.

As noted above, allowing the total amount of air passing through the indoor fan coil unit 14 to be reduced also reduces the cooling needed from the outdoor VRF unit 12, thereby reducing energy usage. The indoor fan coil unit 14 can become aware of the decreased air volume passing through it for managing the speed of the compressor in the outdoor VRF unit 12, since the indoor fan coil unit 14 typically monitors the air pressure within the ducts to maintain a preset external static air pressure. In this respect, the volume modulating valves 102 allow the present system 100 to have a similar energy efficiency as a traditional VRF system 10.

Figure 4:
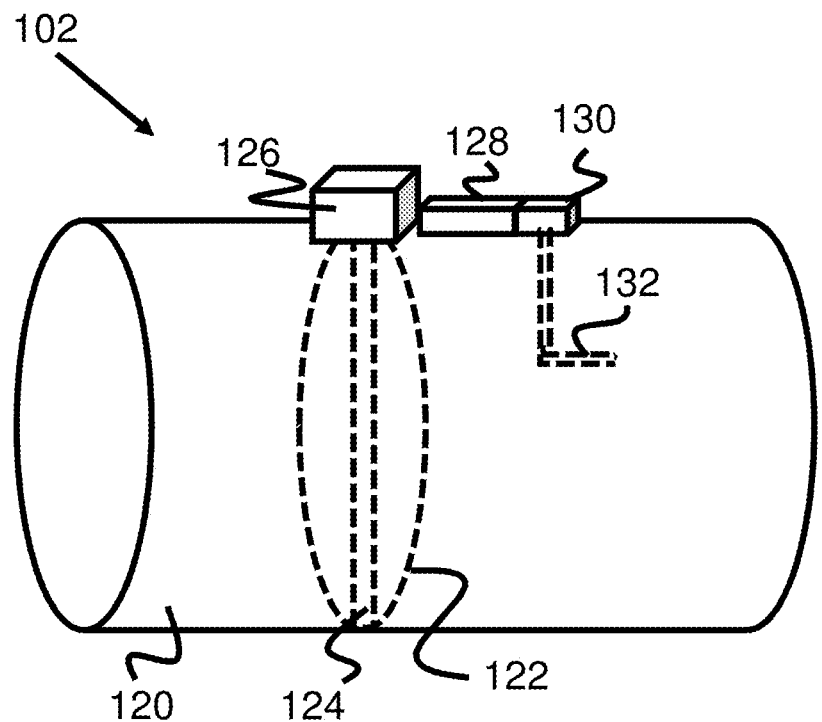
FIG. 4 illustrates a side view of a volume modulating air valve.
Figure 5:
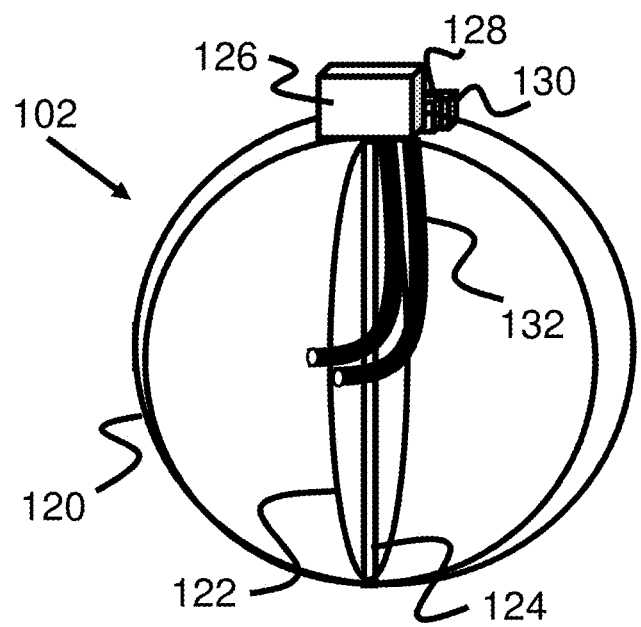
FIG. 5 illustrates a front view of the volume modulating air valve of FIG. 4.

FIGS. 4 and 5 illustrate a side view and an end view of one example embodiment of the volume modulating valve 102. In this example, the volume modulating valve 102 has a tubular body 120 for connection to tubular air ducts. However, it should be understood that other shapes are possible for connection to ducts of other shapes, such as rectangle or square.

The volume modulating valve 102 preferably includes an actuation mechanism, a command and communication mechanism, and a velocity sensing mechanism. The actuation mechanism can be in the form of a motor 126 that is coupled to a shaft 124. The shaft 124 is fixed to valve blade 122 (i.e., a flap) and therefore when the motor 126 rotates the shaft 124, the valve blade 122 also rotates between an open and closed position (i.e., between being oriented cross sectionally in the tubular body 120 or perpendicularly to the cross section). Hence, the valve blade 122 can be not only fully opened and closed but positioned at any orientation in between.

The velocity sensing mechanism of the volume modulating valve 102 can be in the form of one or more pitot tubes 132 that are connected to a pressure sensor 130 that translates the pressure into a voltage and a digital velocity value. A single pitot tube 132 can be used, or as seen in FIG. 5, two or more pitot tubes 132 can be used to give an accurate velocity reading for rectangular ducts or other shaped ducts.

Additionally, other air velocity sensing mechanisms may be used. Preferably, the pitot tubes 132 open upstream of the valve blade 122. This allows for a velocity measurement of the air coming into the room at a constant and known diameter/area (i.e., volume (CFM)=area (Square Feet)×velocity (Feet per Minute). A velocity measurement, preferably upstream of the valve blade, 122 will reflect the velocity after passing by the valve blade 122. It may also be possible to place the pitot tube 132 immediately at a downstream interface of the valve blade 122, though this may require determining the open area that the valve blade 132 creates in various positions, which may be more difficult.

The command and communication system may include a microcontroller (or similar processing device) on a control circuit board 128 that is connected to the pressure sensor 130 and the motor 126, thereby allowing it to read and store a pressure measurement (e.g., a voltage from the pressure sensor) and to modulate the valve blade 122 to various degrees (e.g., apply specific voltages to the motor). Additionally, the microcontroller preferably includes a communication system that can communicate with the thermostat 108 (e.g., via a wired or a wireless connection).

Figure 6:
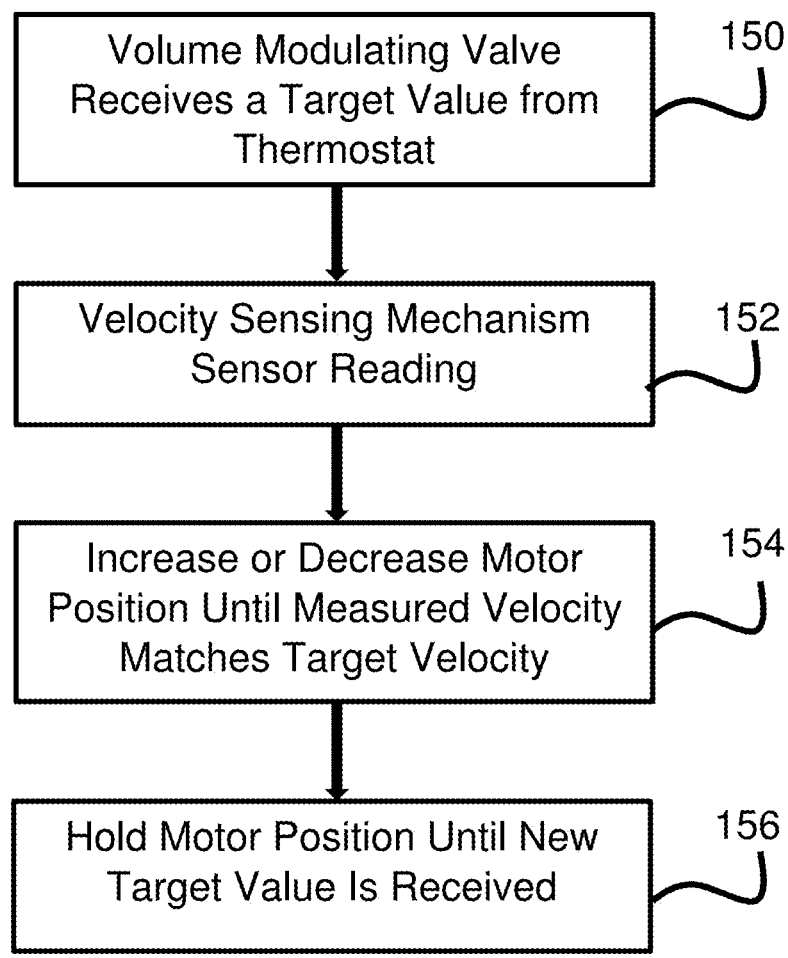
FIG. 6 illustrates a flow chart for operating a volume modulating air valve.

FIG. 6 illustrates a flow diagram showing an example process for controlling the volume of the modulating valve 102. In step 150, the thermostat 108 determines that additional cooling or heating is needed and it transmits a target value to the volume modulating valve 102. This target value can be, for example, 1) a target volume value, 2) a target velocity value, or 3) a potentiometer voltage or valve blade position value. Other types of values are also possible, as long as the thermostat is able to send some type of data that can ultimately cause the regulation of air volume passing through the volume modulating valve 102.

Depending on which of the three example target values are used for the target value, additional processing and conversion of that value will take place. This processing can take place in the thermostat 108, in the control circuit board 128, or some combination of the two where data is exchanged back and forth.

In example 1 of the target value mentioned above, the thermostat 108 may initially determine a desired volume of air that should be sent out through the volume modulating valve 102 and the microcontroller of the control circuit board 128 can then calculate the desired target velocity set by the cool potentiometer, heat potentiometer, and vent potentiometer. Dividing volume by the known area of the valve (i.e., volume (CFM)=area (Square Feet)×velocity (Feet Per Minute). For example, a volume of 400 CFM divided by an area of 0.545 square feet (for a 10-inch diameter valve) equals a velocity of 734 feet per minute.

Alternately in example 2 of the target value mentioned above, the thermostat 108 may already be aware of the diameter/area of the volume modulating valve 102 and can calculate a target velocity that is then transmitted to the control circuit board 128.

With regard to example 3 of the target value mentioned above, it is also contemplated that specific positions of the valve blade 122 can be associated with known air volumes. A certain size volume modulating valve 102 for example, the control circuit board 128 or thermostat 108 may include a table containing data on estimated air volumes with known valve blade positions and air velocities that have been previously set by the potentiometers. The thermostat 108 can send a Heat, Cool or Vent signal to the control circuit board 128 and this signal uses the preset table voltage value set by the potentiometers. Thus, the thermostat 108 can send this position value or the control circuit board 128 can convert a requested target air volume into this position value.

As seen in step 152, once the target value has been converted to a target velocity (at least for examples 1 and 2 above), the control circuit board 128 receives a pressure measurement value from the pressure sensor 130 and converts it to an air velocity within the volume modulating valve 102 (or alternately directly receives a velocity value from the sensor).

As seen in step 154, the control circuit board 128 then adjusts the motor 126 to move the valve blade 122 until that measured velocity value equals the target velocity. For example, if the measured air velocity within the volume modulating valve 102 is lower than the target velocity, the motor 126 is activated to move the valve blade 122 towards the "open" position (e.g., in small increments or continuously) until the target velocity is reached. If the measured air velocity within the volume modulating valve 102 is higher than the target velocity, the motor 126 is activated to move the valve blade 122 towards the "closed" position (e.g., in small increments or continuously) until the target velocity is reached.

Finally, in step 156, the measured air velocity is periodically checked by the control circuit board 128 to confirm that it remains at the target velocity and the motor 126 can be adjusted if the measured velocity varies from the target velocity. In one example, the control circuit board 128 confirms that the measured air velocity equals the target air velocity periodically, such as every 1, 5, 10, or 15 seconds. As previously discussed, the static air pressure within the main duct 103 will change as other volume modulating valves 102 open or close. Hence, by constantly monitoring that the measured air velocity matches the target air velocity, the target air volume will be maintained. This target velocity is held until the control circuit board 128 receives a new target value from the thermostat (e.g., target velocity or target volume) or a command to completely close the valve blade 122 once the appropriate volume of air has been delivered.

Optionally, the volume modulating valve 102 may also include potentiometers (e.g., 3) that are configured to convey the position of the motor 126 and valve blade 122. These potentiometers can be integrated into the control circuit board 128 or can be separately connected to the motor 126 or shaft 124 to relay data on the position of the valve blade 122 to the control circuit board 128. The control circuit board 128 can use predetermined potentiometer positions measured by the pressure sensor 130 as starting points for the valve blade 122 based on what the target value is. After moving to these "starting points," the measuring and adjusting steps 152, 154, and 156 can be performed. This can help get the valve blade 122 in a position to achieve a target velocity while allowing it to be more precisely adjusted after the afore mentioned steps to exactly match the desired target velocity. Alternately, this potentiometer can be used if the target value is a specific position of the valve blade 122 that was previously correlated with a known air volume.

With further regard to the use of the potentiometers, when a thermostat calls for heat or cool (i.e., a target value), the volume modulating valve 102 stores or converts this target value to a potentiometer voltage. The volume modulating valve 102 then takes a reading of its sensor 130 and compares the sensor voltage. These analog voltages are converted to digital counts by an analog to digital converter on the control circuit board 128. The software of the control circuit board 128 compares these counts. If the sensor count is higher than the potentiometer count, the motor opens the valve slightly and reads the counts again. If the sensor count is lower than the potentiometer count, the valve closes slightly and reads the counts again. This continues until the target velocity is reached. The system operates in this manner until the room temperature reaches the target value. When the target value is reached, the thermostat sends the volume modulating valve 102 an instruction to operate in a vent mode which reduces the air flow to 40% or less.

In an alternate embodiment, no potentiometers are necessary. When the room temperature is above a set point, the thermostat sends digital target value to the volume modulating valve 102. This target value calls for full Heat or Cool air velocity. The target count is stored then the control circuit board 128 reads the analog voltage of the sensor 130 and converts it to from analog to a digital value. Just as in the analog version, this digital value is compared to the target value and the motor opens or closes the valve blade 122 until the target voltage is matched. In the cooling mode as the room temperature drops, a new lower velocity target is sent to the volume modulating air valve 102. For each drop in temperature (e.g., two tenths of a degree), a lower velocity target is sent to the volume modulating air valve 102. When the room temperature drops one degree, reaching the set point, the thermostat holds the air delivery. This lower air velocity has a target value equal to the vent position in the Analog version.

Returning to FIGS. 2 and 3, a control unit 110 is connected/wired into a legacy thermostat interface attached to the indoor fan coil unit 14 which allows the control unit 110 to switch the indoor fan coil unit 14 into different modes of operation. Commonly, these modes are: a cooling mode to provide cool air, a heating mode to provide warm air, vent mode to circulate air without a temperature change, and an off mode that provides no heating, or cooling. The control unit 110 is also connected (wired or wireless) to each of the thermostats 108 that are supplied by an indoor fan coil unit 14, allowing the control unit 110 to monitor the cooling/heating needs of the thermostats 108 and set the operational mode of the indoor fan coil unit 14 called for the by the control unit 110.

Figure 7:
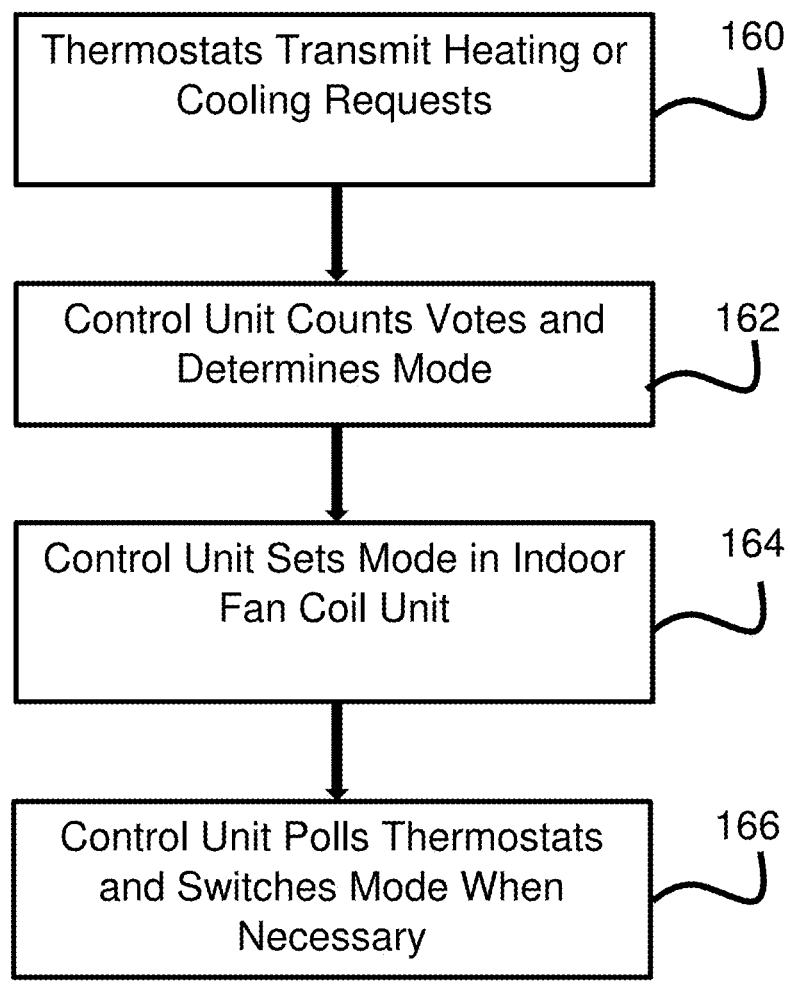
FIG. 7 illustrates a flow chart for operating the HVAC system of FIG. 2.

In one example shown in FIG. 7, the control unit 110 determines the mode of the indoor fan coil unit 14 based on a voting-style algorithm. In step 160, the thermostats each communicate their "vote" or request data for cooling, heating, or neither (no vote) to the control unit 110 where it is stored in memory. This can be a data message identifying the sending thermostat 108 and containing data that represents its request for cooling, heating, or no vote. Sending this "vote" data can be the result of thermostat 108 being polled by the control unit 110 (e.g., the control unit 110 sends out a request to the thermostats 108) or can be transmitted to the thermostats in a predetermined interval of time.

In step 162, the control unit 110 counts the vote data. This count may occur after receiving vote data for all thermostats 108 connected to the control unit 110 or may occur after a predetermined period of time. Next, the control unit 110 determines which mode it should set the indoor fan coil unit 14 to based on which mode received the most votes, with a neither or no vote majority being in favor of the vent mode. While the cooling and heating modes are determined by a majority vote, the vent mode is determined by the thermostat 108 for each valve.

In step 164, the control unit 110 communicates with the indoor fan coil unit 14 to cause it to switch to the vote-determined mode. For example, the control unit 110 can energize a 24-volt legacy output to communicate the vote-determined mode to the indoor fan coil unit 14. Once received, the indoor fan coil unit 14 automatically sets its fan speed based on the total air volume of the valve and the outdoor VRF unit 12 operates its compressor accordingly to circulate refrigerant through the refrigerant pipes 16.

With regard to the vent mode, when a thermostat 108 reaches its set point, the thermostat 108 sends a vent mode request to the volume modulating air valve 102. In one example, the vent mode is less than 40 percent of the cool or heat targets. This reduced volume of air keeps the compressor of the outdoor VRF unit 12 running at a low speed. The compressor can reduce its speed as low as 30 percent, typically, so when all but one of the volume modulating air valves 102 are in vent mode, the refrigerant will be reduced to its minimum circulation state. When all volume modulating air valves are in vent mode the control unit 110 turns off the compressor.

Finally, the control unit 110 continuously polls (e.g., via polling messages) the thermostats 108 at regular intervals (e.g., every minute or two minutes), which causes voting to occur again. This allows to control unit 110 to switch modes on the indoor fan coil unit 14 if necessary.

Several other unique advantages of the present invention should be noted. For example, the air volume in the present invention is controlled without changing the fan speed of the indoor fan coil units 14. In traditional indoor fan coil units 14, three speed fans are often used to limit airflow to the conditioned space and the units 14 are designed to run at full volume. In variable air volume systems, the fan is designed to run at full volume. When some dampers are closed, the excess volume of air is bypassed around the fan/ducts. The present invention improves upon these inefficiencies.

It should also be noted that the present invention's ability to restrict and control fan/air volume without changing fan speed or RPM is inexpensive and efficient. Since the fan of the indoor fan coil unit 14 controls the amount of refrigeration that the outdoor VRF unit 12 sends to each indoor fan coil unit 14, the precise air volume control of the present invention allows the units 12 and 14 to operate efficiently.

While the system 100 is shown in FIG. 2 as having a single indoor fan coil unit 14, it should be understood that several indoor fan coil units 14 can be connected to the outdoor VRF unit 12. In such an example, each of the indoor fan coil units 14 may have their own ducts 103, 104, volume modulating air valves 102, thermostats 108, and control unit 110. Additionally, a system may further include additional indoor fan coil units 14 used in their traditional manner to directly heat/cool a zone 18 without air ducts.

While the volume modulating air dampener 102 is referred to as a valve, it may also be known as a damper.

While the system is described mostly as operating in a cooling capacity, it should be understood that it can also perform heating to zones as well.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An HVAC system, comprising:
   an outdoor VRF unit configured to supply coolant with a compressor;
   an indoor fan coil unit configured to receive coolant from the outdoor VRF unit;
   an air duct network connected to the indoor fan coil unit;
   a plurality of volume modulating air valves connected to the air duct network; and,
   a plurality of thermostats, each of which is connected to one of the plurality of volume modulating air valves;
   wherein each of the volume modulating air valves are configured to 1) restrict passage of air to match a predetermined target volume for heating or cooling based on commands from one of the plurality of thermostats and 2) enter a vent mode when a respective connected thermostat reaches a temperature set point;
   wherein the vent mode of each of the volume modulating air valves maintains an open state at 40% or less of the predetermined target volume for that respective thermostat;
   wherein the compressor of the outdoor VRF unit maintains operation when at least one of the plurality of volume modulating air valves is delivering the predetermined target volume for heating or cooling; and,
   wherein the compressor of the outdoor VRF unit reduces operation to as low as 30% when at least one of the plurality of volume modulating air valves is delivering the predetermined target volume for heating or cooling.

2. The HVAC system of claim 1, wherein each of the plurality of volume modulating air valves comprise:
   a valve body having a passage therethrough;
   a closure mechanism within the passage configured to adjustably restrict passage of air through the passage;
   a motor connected to the closure mechanism;
   an air velocity sensor connected to the valve body and configured to measure an air velocity within the passage; and,
   a command and communication assembly comprising a processor connected to the motor and the air velocity sensor;
   wherein the processor is configured to direct the motor to adjust the closure mechanism to maintain the predetermined target air volume through the passage.

3. The HVAC system of claim 1, further comprising a controller in communication with the plurality of thermostats; the controller configured to connect to a thermostat interface attached to the indoor fan coil unit and switch the indoor fan coil unit to different modes of operation; the controller being configured to operate the indoor fan coil unit via the thermostat interface based on voting messages sent from the plurality of thermostats.

4. The HVAC system of claim 2, wherein the closure mechanism is a valve blade that is rotatably mounted within the passage.

5. The HVAC system of claim 4, wherein the motor is configured to rotate the valve blade within the passage.

6. The HVAC system of claim 2, wherein the air velocity sensor is a pitot tube.

7. The HVAC system of claim 2, wherein the command and communication assembly further comprises a communication interface that is configured to communicate with a thermostat and receive a target air volume value.

8. The HVAC system of claim 2, further comprising one or more potentiometers.

9. The HVAC system of claim 2, wherein the HVAC system is configured to:
   communicate a target value based on the predetermined target volume from a thermostats to one of the plurality of volume modulating air valves;
   measure an air velocity within a passage of the volume modulating air valve to determine a measured air velocity;

direct a motor to adjust a closure amount of the volume modulating air valve until the measured air velocity matches a target velocity based on the target value; and, maintain the measured air velocity at the target velocity by directing the motor to adjust the amount of the volume modulating air valve as necessary.

10. The HVAC system of claim 9, further comprising a rotating valve blade within the air passage.

11. The HVAC system of claim 9, further comprising measuring a voltage from a pitot tube sensor positioned within the passage.

12. The HVAC system of claim 9, wherein the HVAC system is configured to:

transmit heating or cooling requests to a controller from a plurality of thermostats; the controller being configured to operate the indoor fan coil unit based on the heating or cooling requests;

determine a mode of operation with the controller based on the heating or cooling requests; and, change the indoor fan coil unit to the heating or cooling mode of operation with the controller.

13. The HVAC system of claim 1, wherein each of the volume modulating air valves comprises a valve blade and a potentiometer configured to sense a position of the valve blade; and wherein each of the volume modulating air valves are configured to move the valve blade to a predetermined starting position based on the predetermined target volumes for heating or cooling and then further adjust the valve blade based on a measured air velocity in each of the volume modulating air valves.

14. An HVAC system, comprising:

an outdoor VRF unit configured to supply coolant with a compressor;

an indoor fan coil unit configured to receive coolant from the outdoor VRF unit;

an air duct network connected to the indoor fan coil unit;

a plurality of volume modulating air valves connected to the air duct network; and, a plurality of thermostats, each of which is connected to one of the plurality of volume modulating air valves;

wherein each of the volume modulating air valves are configured to 1) restrict passage of air to match a predetermined target volume for heating or cooling based on commands from one of the plurality of thermostat units and 2) enter a vent mode when a respective connected thermostat reaches a temperature set point; wherein the vent mode of each of the volume modulating air valves maintains an open state at less than the predetermined target volume for that respective thermostat; and, wherein the compressor of the outdoor VRF unit maintains operation when at least one of the plurality of volume modulating air valves is delivering the predetermined target volume for heating or cooling;

wherein the compressor of the outdoor VRF unit reduces operation to as low as 30% when at least one of the plurality of volume modulating air valves is delivering the predetermined target volume for heating or cooling.

* * * * *